United States Patent [19]

Rice

[11] 4,016,938
[45] Apr. 12, 1977

[54] METHOD FOR FASTENER TENSIONING

[75] Inventor: Edwin Eugene Rice, Ann Arbor, Mich.

[73] Assignee: Ingersoll-Rand Company, Woodcliff Lake, N.J.

[22] Filed: Dec. 2, 1975

[21] Appl. No.: 636,984

[52] U.S. Cl. .................................. 173/1; 173/12
[51] Int. Cl.² .................................. B23Q 19/06
[58] Field of Search ............... 73/133, 136, 139; 173/12; 81/52.4 R, 51.5

[56] References Cited
UNITED STATES PATENTS

| | | | |
|---|---|---|---|
| 3,494,430 | 2/1970 | Lehmann et al. | 81/52.4 RX |
| 3,693,726 | 9/1972 | Hörnig | 173/12 |
| 3,920,088 | 11/1975 | Dudek | 173/12 |
| 3,939,920 | 2/1976 | Hardiman et al. | 173/12 |

*Primary Examiner*—Ernest R. Purser
*Assistant Examiner*—William F. Pate, III
*Attorney, Agent, or Firm*—Walter C. Vliet

[57] ABSTRACT

A fastener tensioning system for use with torque producing power tools, such as, nut runners or the like. The system includes apparatus to rotate the fastener and determine when the fastener has been driven to its yield point in tension, and, thereafter, the fastener is backed out a precise amount of rotation to establish a level of tension in the fastener below the yield point. The method of this invention improves upon the conventional turn-of-the-nut method for fastener tensioning; in that, the precise fastener rotation is started from a relatively well-known and well-defined point as opposed to a arbitrary predetermined low level of torque. In addition, the method assures by inspection the proper condition of the bolt and thread prior to making the final tensioning step.

7 Claims, 2 Drawing Figures

METHOD FOR FASTENER TENSIONING

BACKGROUND OF THE INVENTION

Accurate control over the tension applied to threaded fasteners for machinery is of increasing importance in assembly operations. Various devices have been utilized in fastener tightening power tools to shut off the power supply or disengage the power tool from the fastener at a predetermined torque output. The resulting tension produced in the fastener, however, has not been within the required tolerances for maximum fastener utilization. Several methods have been developed which improve tensioning accuracy, such as, the so-called "turn of the nut" or "constant energy application" method. In U.S. patent application, Ser. No. 601,441, of which I am a co-inventor, several methods of fastener tensioning and inspection are described, which are capable of producing a relatively accurate tension level within the fastener, and simultaneously detect common fastener faults, such as, cross threading, thread stripping, defective bolt, etc. One of the methods described in the above-referenced patent application includes the steps necessary to detect the point at which a bolt begins to yield; that is, when the increase in the torque is no longer proportional to the increase in rotation. The power tool is shut off in response to the yield point detection; the shut off occurring within a predetermined range of a second parameter chosen to serve as a inspection method. In the above method, yield point of the fastener is precisely determined and must fall within a predetermined range as a inspection method.

SUMMARY OF THE INVENTION

The present invention utilizes the precise yield point determination described in the above-referenced patent application and by means of a unique additional step teaches a means for producing a level of tension in the fastener below the yield point tension. The object of this invention, therefore, is to provide a fastener tensioning system which accurately establishes a level of tension in the fastener determined in relationship to the accurately determined yield point of the fastener. A further object of this invention is to teach a device suitable for use in assembly line fastener installation for producing accurate and reliable levels of tension within the fastener. In addition, this system has the capability of inspecting or assuring that the appropriate level of tension has been achieved in the fastener.

In general, these and other objects are achieved in a torque and tension control and inspection system for power tools comprising: a power wrench for tightening a fastener; means for measuring the torque placed on the fastener by said wrench; means for detecting a predetermined low level of initial torque and creating a signal in response thereto; means for receiving the signal and in response thereto starting to measure an incremental function of torque increase per incremental function of rotation and a fuction other than torque associated with the continued tightening of the fastener; and means for receiving the incremental function of torque increase on the fastener and the measurement of the function of the fastener and comparing the measurements to determine if the incremental function of torque becomes a non-linear function within a predetermined range of the measurement of the function of the fastener to detect whether the fastening unit is defective; and untightening the fastener a predetermined amount of rotation to establish a lesser tension level.

DESCRIPTION OF THE PREFERRED EMBODIMENT

In U.S. patent application, Ser. No. 601,441, several methods involving torque and rotation are described for determining fastener tension. One of the methods described utilizes a combination of torque and rotation and by means of differentiating circuitry is capable of detecting the point at which the bolt begins to yield; for example, when the increase in torque is no longer proportional to the increase in rotation. In that example, the power tool will shut off in response to yield point detection. For purposes of describing the present invention, a portion of that method will be repeated here for convenience. The unique apparatus and method of the present invention will then be described.

Figure 1:
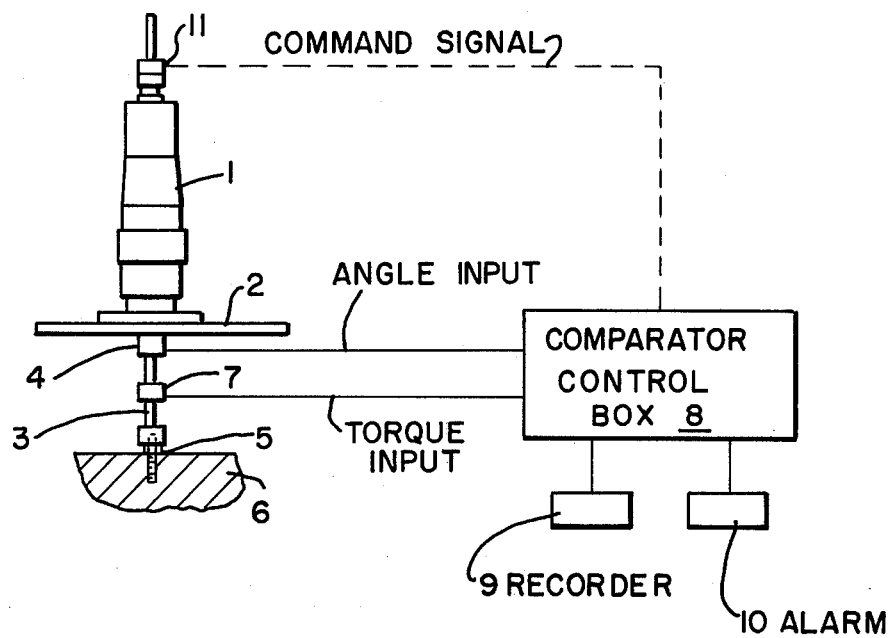
FIG. 1 is a schematic of the torque and tension control and inspection system of this invention.

Referring to FIG. 1, a conventional reversible torque-producing air power tool is shown and generally designated as 1. The tool is mounted on a tool holder 2 and arranged to drive fastener 5 into workpiece 6. The tool 1 has its output on spindle 3. The torque output of tool 1 on spindle 3 is measured by torque transducer 7 which may be of the four arm strain gauge bridge type. For purpose of the preferred embodiment shown, the rotation of spindle 3 is measured by shaft position encoder 4 which may be of the optical angular encoder type utilizing a photo cell to produce a signal pulse. Output of both the torque transducer 7 and the shaft position encoder 4 are fed to the comparator control box 8 which includes instrument type amplifier circuits for the various function to be described later. A recorder 9 is provided to have a record of the tightening process and an alarm system 10 signals defects outside of the prescribed limits. A fast response shut off valve 11 is interposed in the air supply line to the power tool.

Figure 2:
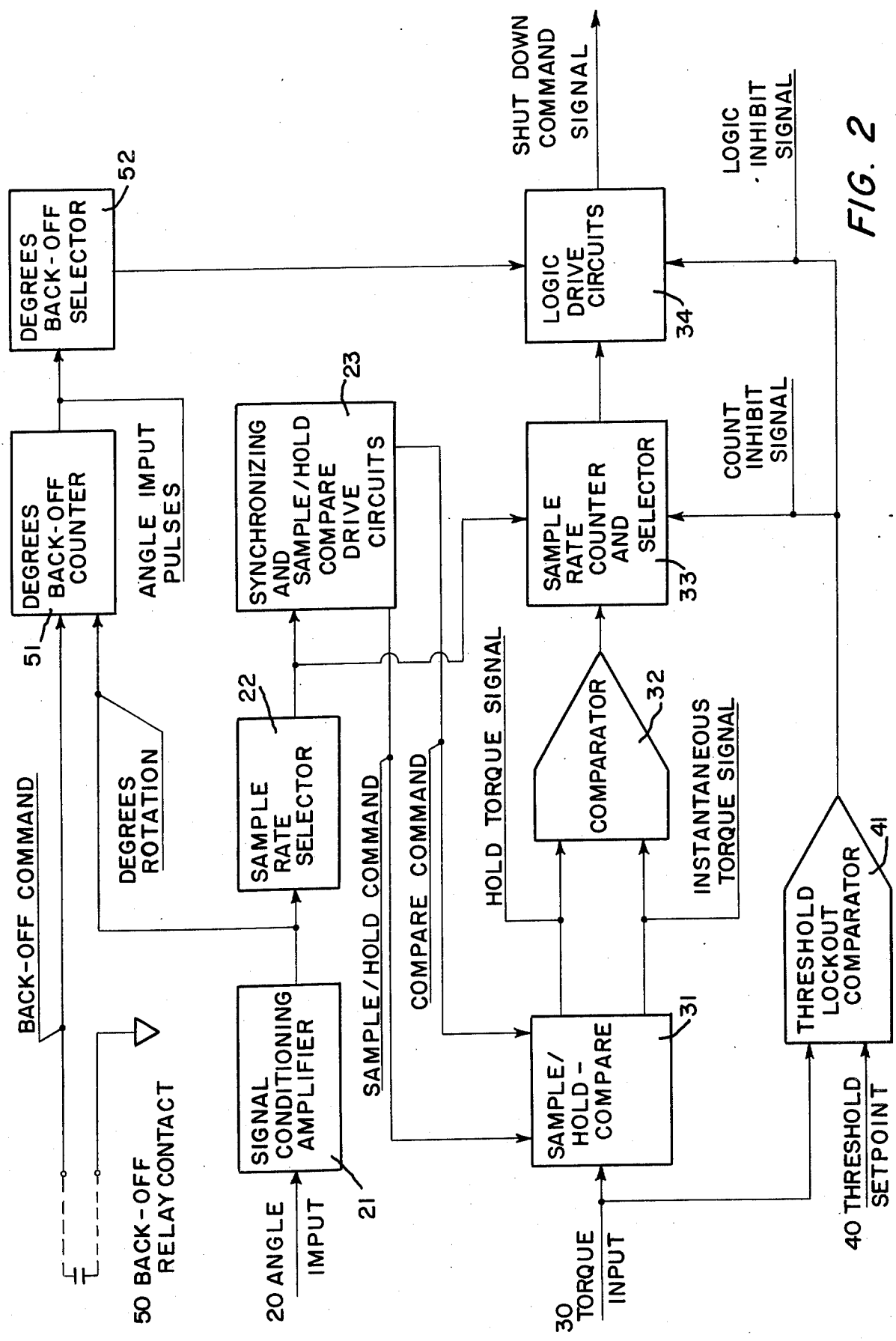
FIG. 2 further details the schematic of FIG. 1 showing the analogue components necessary to accomplish this invention.

The operation and schematic for carrying out the preferred embodiment of this invention is shown in FIG. 2 and is described as follows: The tension monitor circuit has three inputs: Encoder angle pulses, torque analog signal and threshold setpoint. These three inputs are combined to generate a shut-down signal to stop rotation of the air motor.

The angle input pulses 20 are applied to a signal conditioning amplifier 11 where they are changed into a clean square wave signal. This square wave signal represents the air motor rotation producing one pulse per degree. The output of the signal conditioning amplifier is connected to a sample rate selector 22. The sample rate selector is preset to select the rate at which the torque signal will be sampled (i.e., sample/1°, sample/2°, sample/4°, etc.).

The sample pulses from the rate selector are connected to a synchronizing and sample/hold-compare drive circuit 23. This circuit provides the necessary timing and command signals to the sample/hold and compare circuit.

The torque input signal 30 is also fed into a sample/-hold-compare circuit 31. On each sample/hold command the torque signal is sampled and its value is stored until the next command is received. This held torque level signal is connected to one input of a comparator 32. After a predetermined number of degrees of rotation, a compare command signal is generated and the instantaneous torque signal at the new point is applied to the other input of the comparator. The output of the comparator is normally negative. Whenever the instantaneous signal is significantly larger than the held signal, the output of the comparator goes positive. Since the compare signal is pulsed and the held signal is a steady DC voltage, the output of the comparator will be a pulsed positive signal if the instantaneous torque signal is sufficiently greater than the stored sample. Thus if the torque increases sufficiently above a preselected amount (torque rate), a pulsed positive signal is produced. The output of the comparator is connected to the sample rate counter 33 and used as a reset signal for the counter.

The count input of the rate counter is connected to the sample rate selector and attempts to count up. However, the positive pulses from the comparator continue to reset the counter as long as the torque rate is above a preset value and it never exceeds one count. When the torque signal changes (torque rate) are less than the predetermined value, no output pulse is received from the comparator; therefore, the counter is allowed to count the sample rate pulses beyond one since it is not reset. A selector on the output of the counter is used to determine how many sample periods of little or no change in torque must occur consecutively before an output signal is generated. The count function is performed to avoid false signaling from transient torque changes.

A threshold setpoint signal 40 in the form of a selectable DC voltage is connected to one input of a comparator 41 and the other input of the comparator 41 is connected to the torque input. The output of the comparator 41 is normally negative. When the torque input voltage level exceeds the threshold setpoint voltage level, the output of the comparator goes positive removing a count inhibit input to the sample rate counter and a logic inhibit input to the logic drive circuits 34.

Until the torque signal exceeds the setpoint level selected, the sample rate counter 33 will not count and the logic drive circuits 34 are locked out. This prevents a false shutdown signal from being generated during free run of the fastener, thus insuring a snug joint before any critical measurements are made. When the torque signal does exceed the setpoint and reaches a point where little or no change in torque occurs for a selected number of sample periods, an output signal from the sample rate counter is applied to the logic drive circuits and a shutdown command signal to the shutdown valve is generated, stopping the air motor.

To this point, the operation of the preferred embodiment is similar to that shown and described in U.S. patent application, Ser. No. 601,441. The fastener has been run down to a initial level of torque sufficient to assure that the fastener has been reliably seated. Thereafter, by means of the differentiating circuitry, the fastener is rotated until the system detects the yield point. If the yield point occurs within the prescribed limits set for rotation and torque, the condition of the fastener and the torquing sequence to this point have been inspected according to the method of U.S. patent application, Ser. No. 601,441. It remains for me to describe the unique additional steps to accomplish the method and apparatus for the present invention. Referring again to FIG. 2, the tension monitoring apparatus requires two additional circuits and a back-off command input signal.

The back-off function begins when the air motor has stopped rotating, due to a shutdown command being received by the shutdown valve. At this point an external relay contact 50 is made producing a back-off command signal to a degrees back-off counter 51.

When the air motor is rotated backwards, angle input pulses are applied to the signal conditioning amplifier 21. The output of the signal conditioning amplifier is a square wave signal which represents the air motor rotation producing one pulse per degrees.

The square wave pulses are connected to the degrees back-off counter 51. The counter is allowed to count these pulses when it has a back-off command signal.

The degrees back-off selector 52 determines how many degrees must be counted before it passes a signal to the logic drive circuits 34.

Once the logic drive circuits 34 receive a signal from the degrees back-off selector, a shutdown command signal is generated to the same shutdown valve used for yield point detection thus stopping the air motor.

Thus, it may be seen by one skilled in the art that by means of apparatus shown and described above, a fastener may be reliably brought to its yield point and the condition of the fastener inspected, and in addition, by means of the unique steps described for the method of this invention, the level of tension in the fastener occurring at the yield point may be accurately reduced to any given second or lower level of tension required for effective utilization of the fastener. Because of the reliability of determining the tension at the yield point and the reliable worked condition of the fastener threads now obtained, it is possible to obtain a tension in the fastener which is extremely accurate. It should be obvious to one skilled in the art that where a cold working of the fastener or its mating thread is desirable the above-disclosed method may be repeated as required to produce the desired results. Applicants do not wish to be limited to the details of the preferred embodiment shown. Numerous other methods of bringing the fastener to yield point or even some point accurately controlled beyond the yield point may be utilized in conjunction with the unique method of this invention. It should be understood that the invention is not limited except by the scope of the claims.

I claim:
1. Apparatus for threaded fastener tensioning comprising:
   a power wrench for rotating the fastener;
   differentiating means for determining when the fastener has been rotated into its non-proportional range in tension and stopping the power wrench;
   rotation means for untightening the fastener a predetermined rotary angle using the fastener thread as a means of fastener strain measurement; and
   means for stopping the power wrench after said fastener is untightened said predetermined rotary angle.
2. The apparatus of claim 1 wherein:
   said differentiating means detects when the fastener has been rotated to its yield point in tension and stops the power wrench.
3. Apparatus for threaded fastener tensioning comprising:
   a power wrench for tightening a fastener;

means for measuring the torque placed on the fastener by said wrench;

means for measuring rotation of the fastener;

means for detecting a predetermined low level of initial torque and creating a first signal in response thereto;

means for receiving said first signal and in response thereto starting to measure an incremental function of torque increase per incremental function of rotation of the fastener;

means for receiving the incremental function of torque increase per incremental function of rotation of the fastener and comparing the measurements to determine when the incremental function of torque becomes a non-linear function and creating a second signal in response thereto;

means for stopping further fastener tightening in response to said second signal; and means for untightening the fastener a predetermined rotary angle using the fastener thread as a means of fastener strain measurement to establish a lesser tension.

4. A method for establishing a tension level in a threaded fastener comprising:

tightening the fastener into its yield range by power wrench means;

establishing a signal in response to the fastener tension reaching the yield point;

shutting off the wrench in response to said signal; and untightening the fastener a predetermined rotary angle using the fastener thread as a means of fastener strain measurement to establish a lesser tension in the fastener.

5. The method of claim 4, further comprising:

the additional step of determining if the yield point occurred within a predetermined range of a continuously measured function of the fastener to detect whether the fastening unit is defective.

6. The method of claim 5 wherein:

said continuously measured function is rotation.

7. The method of claim 5 wherein:

said continuously measured function is torque.

* * * * *